United States Patent [19]

Sekiguchi

[11] Patent Number: 5,144,494
[45] Date of Patent: Sep. 1, 1992

[54] ZOOM LENS BARREL

[75] Inventor: Tetsuo Sekiguchi, Tokyo, Japan

[73] Assignee: Asahi Kogaku Kogyo Kabushiki Kaisha, Tokyo, Japan

[21] Appl. No.: 655,298

[22] Filed: Feb. 14, 1991

[30] Foreign Application Priority Data

Feb. 14, 1990 [JP] Japan ..................... 2-33009

[51] Int. Cl.⁵ .................... G02B 7/04; G03B 13/00
[52] U.S. Cl. .................... 359/700; 359/823; 354/195.12
[58] Field of Search ............ 350/255, 257, 429, 430; 354/195.1, 195.12; 359/823, 827, 694, 701, 699, 700, 703, 693

[56] References Cited

U.S. PATENT DOCUMENTS

| 4,324,457 | 4/1982 | Tomori . |
| 4,333,712 | 6/1982 | Tomori . |
| 4,387,968 | 6/1983 | Sekiguchi . |
| 4,523,815 | 6/1985 | Tomori . |
| 4,639,083 | 1/1987 | Fuziwara et al. ............ 350/255 |
| 4,822,153 | 4/1989 | Tomori et al. . |
| 4,910,544 | 3/1990 | Nomura . |

FOREIGN PATENT DOCUMENTS

| 55-103606 | 7/1980 | Japan . |
| 1432961 | 4/1976 | United Kingdom . |
| 2019602 | 10/1979 | United Kingdom . |

Primary Examiner—Constantine Hannaher
Assistant Examiner—Edward J. Glick
Attorney, Agent, or Firm—Sandler, Greenblum & Bernstein

[57] ABSTRACT

A zoom lens barrel having an adjusting ring connected to a cam ring through a gear ring. The cam ring is rotatably supported by a stationary cylinder in which some of the lens groups are housed. The gear ring is fixed to the cam ring. The stationary cylinder is provided with the adjusting ring, which is movable relative to the stationary cylinder and along the optical axis. The adjusting ring is connected to the cam ring in such a manner that the adjusting ring and the cam ring can be rotated relative to each other and can be moved along the optical axis as a single body.

22 Claims, 3 Drawing Sheets

Fig. 3
Fig. 4
Fig. 5
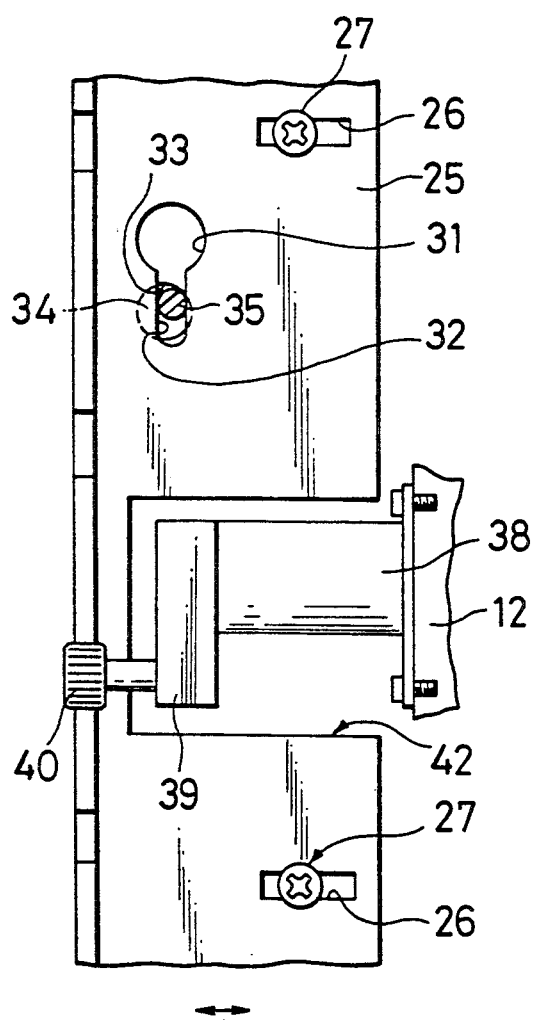
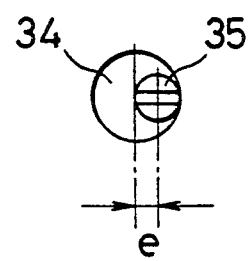
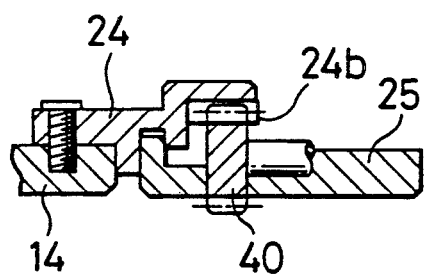

ZOOM LENS BARREL

BACKGROUND OF THE INVENTION

1. Field of the Invention

The present invention relates to a zoom lens barrel, and more particularly, to a mechanism for a back focal distance adjustment of the zoom lens barrel during assembly of a camera.

2. Description of the Related Art

Usually, the adjustment of a focus of a zoom lens is carried out during assembly of a camera in two steps, as follows; a first step of a zoom adjustment in which the zoom lens is adjusted so that an in-focus position is not changed by a zoom operation, and a second step of a back focal distance adjustment in which the in-focus position, which has not been changed by a zoom operation, is adjusted to coincide with a film face position. The back focal distance adjustment is refered to as a back adjustment hereinafter. The zoom adjustment, i.e., the first step, is usually carried out by moving a first lens group along the optical axis, and the back adjustment, i.e., the second step, is carried out by moving all of the lens groups along the optical axis.

Conventionally, the back adjustment is carried out by moving a cam ring, by which the positions of all of the lens groups along the optical axis are determined, but if the zooming operation is automatic, i.e., is carried out by a motor and a battery installed in a zoom lens barrel, the following problems occur. Namely, to install the motor and the battery in the zoom lens barrel, the cam ring must be provided with a notch in which the motor and the battery are positioned. Note if such a notch is not provided, the motor and the battery must be disposed outside the cam ring, and the size of the zoom lens barrel is increased. This notch, however, must be large enough to ensure that the cam ring does not interfere with the motor and the battery over the whole rotation range of the cam ring, i.e., from the tele-photo end to the wide-angle end. As a result, the mechanical strength of the cam ring is lowered, and accordingly, the cam ring is easily deformed. If the cam ring is deformed, not only do the lens positions become incorrect but also a torque change occurs and a smooth movement of the lens can not be obtained, and further in an electrically driven zooming operation, a motor speed or zooming speed fluctuates during the zooming operation.

SUMMARY OF THE INVENTION

Therefore, an object of the present invention is to provide a zoom lens barrel by which a back adjustment can be carried out without a significant deformation of the cam ring.

According to the present invention, there is provided a zoom lens barrel comprising an adjusting ring mounted over a stationary cylinder in such a manner that the adjusting ring is movable relative to the stationary cylinder and along the optical axis, and a connecting mechanism which connects the adjusting ring to the cam ring in such a manner that the adjusting ring and the cam ring can be rotated relative to each other and can be moved along the optical axis as a single body.

Further, according to the present invention, there is provided a zoom lens device comprising lens groups for carrying out a zooming operation, a stationary cylinder, a cam ring, an adjusting ring, and a connecting mechanism. The stationary cylinder houses the lens groups; the cam ring is rotatably supported by the stationary cylinder; the adjusting ring is provided on the stationary cylinder in such a manner that the adjusting ring is movable relative to the stationary cylinder and along the optical axis; and the connecting mechanism connects the adjusting ring to the cam ring in such a manner that the adjusting ring and the cam ring can be rotated relative to each other and can be moved along the optical axis as a single body.

Still further, according to the present invention, is a zoom lens barrel in which the positions of all lens groups along the optical axis are determined in accordance with a position of a cam ring along the optical axis which is rotatably supported by a stationary cylinder, the stationary cylinder is provided with an adjusting ring in such a manner that the adjusting ring is movable relative to the stationary cylinder and along the optical axis, and the adjusting ring and the cam ring are connected in such a manner that the adjusting ring and the cam ring can be rotated relative to each other and can be moved along the optical axis as a single body.

BRIEF DESCRIPTION OF THE DRAWINGS

The present invention will be better understood from the description of the preferred embodiments of the invention set forth below, together with the accompanying drawings, in which:

FIG. 3 is an extension view showing an adjusting ring and an inner stationary ring, wherein the view of the adjusting ring is taken along line III—III in FIG. 1;

FIG. 4 is a plane view showing an adjusting pin and a rotation pin; and

FIG. 5 is a sectional view showing a main part of another embodiment of the present invention.

DESCRIPTION OF THE PREFERRED EMBODIMENTS

Figure 1:
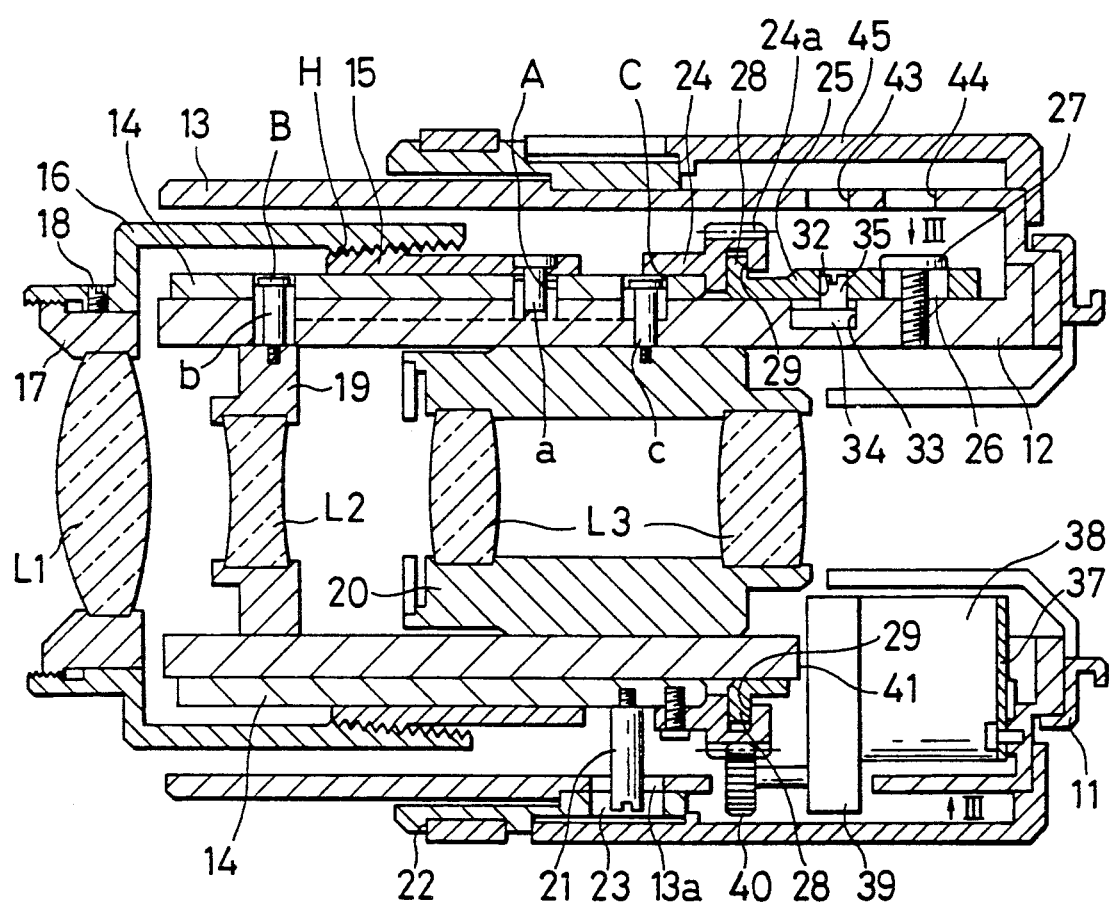
FIG. 1 is a sectional view of a zoom lens barrel of an embodiment of the present invention.

The present invention will now be described with reference to embodiments shown in the drawings.

With reference to FIG. 1, an inner stationary cylinder 12 and an outer stationary cylinder 13 are connected to a mount ring 11 in such a manner that these elements form a single body. A cam ring 14 is rotatably fitted to an outer surface of the inner stationary ring 12, and a lens moving ring 15 is fitted to an outer surface of the cam ring 14 which has three cam grooves A, B, and C. A focusing ring 16 is threadingly fitted to an outer surface of the lens moving ring 15 through a helicoid H, and a first lens frame 17 to which a first lens group L1 is connected, is threadingly fitted in the focusing ring 16. The first lens frame 17 is moved along the optical axis by a rotation thereof relative to the focusing ring 16, whereby a zooming adjustment is carried out. The focusing ring 16 is provided with a set screw 18.

A second lens frame 19 to which a second lens group L2 is connected, and a third lens frame 20 to which a third lens group L3 is connected, are respectively fitted to an inner surface of the inner stationary cylinder 12. Pins b and c are fixed to the second lens frame 19 and the third lens frame 20, respectively. A pin a is fixed to the lens moving ring 15. These pins a, b, and c are engaged with the cam grooves A, B, and C of the cam ring 14, respectively, and with straight guide grooves formed in the inner stationary cylinder 12, independently of each other. Therefore, when the cam ring 14 is rotated, due to the shapes (not shown) of the cam grooves A, B, and C, the lens moving ring 15 (i.e., the first lens group L1), the second lens frame 19 (i.e., the second lens group L2), and the third lens frame 20 (i.e., the third lens frame L3) are moved linearly along the optical axis, whereby a zooming operation is carried out. On the other hand, if the focusing ring 16 is rotated, in accordance with the helicoid H, the focusing ring 16 (i.e., the first lens group L1) is rotatably moved along the optical axis to carry out a focusing operation. In the above-described mechanism, if a position of the cam ring 14 in the optical axis is micro-adjusted, the positions of all of the lens groups, i.e., the first, second and third lens groups L1 through L3, in the optical axis are precisely adjusted.

The cam ring 14 is provided with a manual pin 21 which is engaged in a slot 23 formed in a manual zoom ring 22 and extending along the optical axis. The manual zoom ring 22 is rotatably supported by an outer surface of the outer stationary cylinder 13. Therefore, when the manual ring 22 is rotated, the manual pin 21 causes the cam ring 14 to be rotated together with the manual zoom ring 22.

A gear ring 24 is fixed to a rear end of the cam ring 14 and is connected to an adjusting ring 25 fitted to an outer surface of a rear portion of the inner stationary cylinder 12, as described later. The adjusting ring 25 is provided with a slot 26 extending along the optical axis, and the inner stationary cylinder 12 is provided with a guide screw 27 which is engaged with the slot 26. Accordingly, although the adjusting ring 25 is movable relative to the inner stationary cylinder 12 along the optical axis, the rotation of the adjusting ring 25 relative to the inner stationary cylinder 12 is restricted.

Figure 2:
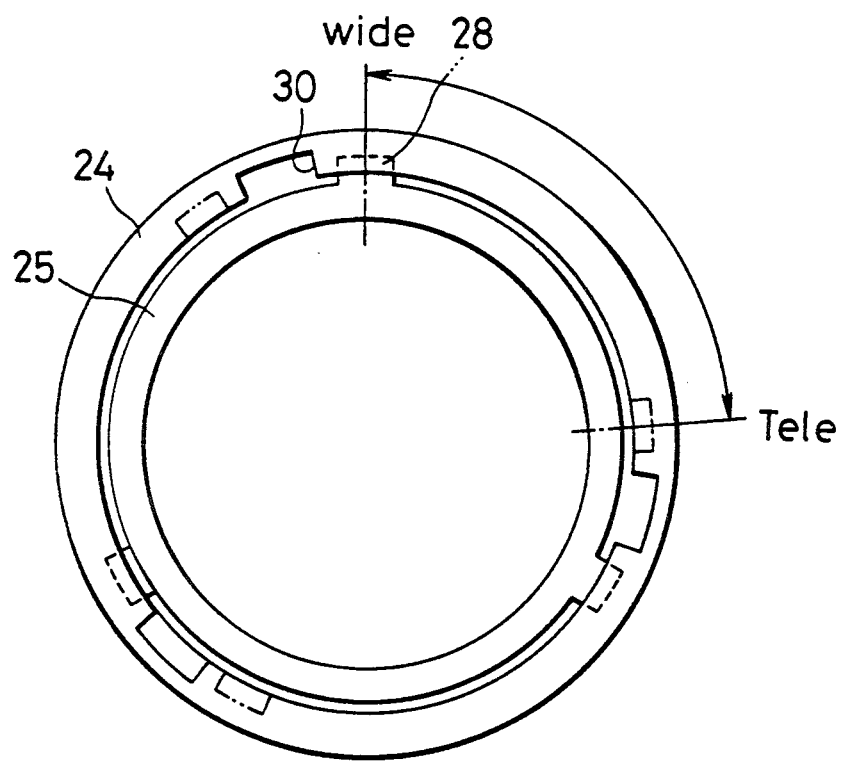
FIG. 2 is a front view showing an engagement of a gear ring and an adjusting ring.

The front end of the adjusting ring 25, as shown in FIG. 2, is provided with radial projections 28 at predetermined intervals along the circumference of the adjusting ring 25. The gear ring 24 is provided with an annular groove 29 with which the radial projections 28 are engaged, for a rotation in the annular groove 29, and notches 30 through which the radial projections 28 are insertable to the annular groove 29. Namely, since the radial projections 28 are engaged in the annular groove 29, the gear ring 24 and the adjusting ring 25 are connected in such a manner that they are rotated relative to each other but are moved along the optical axis as a single body.

The radial projections 28, the notches 30, and the annular groove 29 are formed in such a manner that, in the range of movement from the telephoto end to the wide-angle end, the positions of the radial projections 28 and the notches 30 do not coincide with each other. Also, the rotation of the cam ring 14 is restricted at the telephoto end and the wide-angle end by an engagement of the manual pin 21 in a slot 13a formed in the outer stationary cylinder 13 and extending along the circumference of the outer stationary cylinder 13 between the telephoto end and the wide-angle end.

As shown in FIG. 3, the adjusting ring 25 is provided with a large diameter hole 31, and an elongated hole 32 extending along the circumference of the adjusting ring 25 and connected to the large diameter hole 31. The inner stationary cylinder 12 is provided with a support hole 33 at the same optical axis position as the large diameter hole 31. An adjusting disk 34 is rotatably fitted in the support hole 33. The adjusting disk 34 is provided with a rotation pin 35 offset from the center of the adjusting disk 34 by an offset amount "e", as shown in FIG. 4, and the rotation pin 35 is engaged with the long hole 32.

With reference to FIG. 1, a motor mounting plate 37 is provided at an inner surface of a rear end of the outer stationary cylinder 13, and a motor 38 for driving the cam ring 14, to thereby carry out a zooming operation, is fixed to the motor mounting plate 37. The rotation of the motor 38 is transmitted to a pinion 40 through a gear box 39. The pinion 40 is meshed with a gear 24a formed on an outer surface of the gear ring 24.

The inner stationary cylinder 12 is provided with a notch 41 (FIG.1) and the adjusting ring is provided with a notch 42 (FIG. 3.) The motor 38 is positioned in the notches 41 and 42. The notch 42 extends for approximately 4/5 of the axial length of the adjusting ring 25. Accordingly, it is not necessary to provide the cam ring 14 with a notch in which the motor 38 can be positioned.

The outer stationary cylinder 13 is provided with operation holes 43 and 44 at positions corresponding to the rotation pin 35 and the guide screw 27, respectively. The operation holes 43 and 44 are covered by a cover cylinder 45, which is connected to a rear end of the outer stationary cylinder 13 and with which the manual zoom ring 22 can be engaged to stop a movement in the axial direction thereof.

In the zoom lens barrel constructed as described above, a zooming adjustment and a back adjustment are carried out as follows.

First, the zooming adjustment is carried out in such a manner that the first lens frame 17 is rotated relative to the set screw 18 so that an in-focus position is not moved by a zooming operation. After this zooming adjustment, the set screw 18 is fixed, and the rotation pin 35 is then rotated, to adjust a position of the adjusting ring 25 along the optical axis. This rotation of the rotation pin 35 enables the adjusting ring 25 to be moved along the optical axis by, at a maximum, double an offset amount "e", which is a distance between the adjusting disk 34 and the rotation pin 35. Since the radial projections 28 formed at the front end of the adjusting ring 25 are engaged in the annular groove 29 of the gear ring 24, the gear ring 24 is moved along the optical axis with the adjusting ring 25 as a single body, and accordingly, all of the lens groups L1 through L3 are moved along the optical axis. Namely, the positions of the lens groups L1 through L3 in the optical axis are determined by a position of the gear ring 24 in the optical axis, and thus the back adjustment can be carried out so that an in-focus position coincides with the film face.

When the back adjustment is completed, the guide screw 27 is tightened and the adjusting ring 25 is thus fixed to the inner stationary cylinder 12. Note that the breadth of the gear 24a of the gear ring 24 is sufficient to maintain an engagement of the pinion 40 and the gear 24a during the back adjustment operation.

After the above adjustments are completed, due to the engagement of the radial projections 28 and the annular groove 29, the cam ring 14 can not be moved along the optical axis but can be rotated about the optical axis. Therefore, a power zoom operation by the motor 38 or a manual zoom operation by using the manual zoom ring 22 can be smoothly carried out. Since the cam ring 14 is not provided with a notch for housing the motor 38, which notch would lower the strength of the cam ring 14, the possibility of a deformation of the cam ring 14 and a corresponding mis-positioning of the lens groups, and fluctuations in the zooming speed of the motor 38, are eliminated. Namely, since the adjusting ring 25 is moved along the optical axis only for the back adjustment, and is fixed to the inner stationary cylinder 12 after such an adjustment, the length of the notch 42 along the circumference of the adjusting ring 25 is short, and therefore, the problem of and adverse affect thereof on the strength does not arise.

FIG. 5 shows another embodiment of the present invention, in which the gear ring 24 is provided with a gear 24b, on an inner surface thereof, with which the pinion 40 is meshed. The gear 24a in the first embodiment and the gear 24b in the second embodiment may be formed on the cam ring 14 as one body.

The mechanism for moving the adjusting ring 25 along the optical axis may be modified in various ways. For example, the adjusting ring 25 can be fixed at a predetermined position by using an adjusting jig having an offset pin on an end thereof, or by movably supporting the adjusting ring 25 along the optical axis and moving the adjusting ring 25 by hand.

Note that, although the present invention is applied to an electrically driven zoom lens barrel in the above embodiments, the present invention can be applied to a zoom lens barrel in which an element or elements other than the motor 38 and the battery are housed in the lens barrel.

Although the embodiments of the present invention have been described herein with reference to the accompanying drawings, obviously many modifications and changes may be made by those skilled in this art without departing from the scope of the invention.

I claim:

1. A zoom lens barrel in which positions of all lens groups along the optical axis are determined in accordance with a position of a cam ring along an optical axis, said cam ring being rotatably supported by a stationary cylinder, said zoom lens barrel comprising:
   an adjusting ring mounted over said stationary cylinder in such a manner that said adjusting ring is movable relative to said stationary cylinder and along the optical axis, said cam ring and said adjusting ring being successively positioned along the direction of the optical axis; and
   means for connecting said adjusting ring to said cam ring in such a manner that said adjusting ring and said cam ring can be rotated relative to each other and can be moved along the optical axis as a single body for a back focal distance adjustment of the zoom lens.

2. A zoom lens barrel according to claim 1, wherein said connecting means is provided with a gear ring connected to said adjusting ring which is able to rotate relative to said adjusting ring and which can also move along the optical axis together with said adjusting ring.

3. A zoom lens barrel according to claim 2, wherein said adjusting ring is provided with projections at predetermined intervals along the circumference thereof, and said gear ring is provided with an annular groove with which said projections are engaged and rotate in said annular groove, and notches through which said projections are inserted into said annular groove.

4. A zoom lens barrel according to claim 3, wherein said projections, said notches, and said annular groove are formed in such a manner that, in a range from the telephoto end to the wide-angle end, the positions of said projections and said notches do not coincide with each other.

5. A zoom lens barrel according to claim 2, wherein said gear ring is provided with a gear on an outer surface thereof, and a rotation of a motor for driving said lens groups is transmitted to said gear ring through said gear.

6. A zoom lens barrel according to claim 2, wherein said gear ring is provided with a gear on an inner surface thereof, and a rotation of a motor for driving said lens groups is transmitted to said gear ring through said gear.

7. A zoom lens barrel according to claim 1, wherein said adjusting ring is provided with a slot extending along the optical axis, and said stationary cylinder is provided with a guide screw which is engaged with said slot, whereby said adjusting ring is movable relative to said stationary cylinder along the optical axis and a rotation thereof relative to said stationary cylinder is restricted.

8. A zoom lens barrel according to claim 1, wherein said adjusting ring is provided with a large diameter hole and an elongated hole extending along the circumference thereof and connected to said large diameter hole, said stationary cylinder having a support hole at the same optical axis position as said large diameter hole and being provided with an adjusting disk in said support hole, said adjusting disk having a rotation pin at a position offset from the center of said adjusting disk and being engaged with said elongated hole.

9. A zoom lens barrel according to claim 1, wherein said adjusting ring is provided with a notch in which a motor for driving said lens groups to carry out a zooming operation is positioned.

10. A zoom lens barrel according to claim 1, wherein said adjusting ring is incapable of overlapping said cam ring along the optical axis.

11. A zoom lens device comprising:
   lens groups for carrying out a zooming operation;
   a stationary cylinder in which a part of said lens groups is housed;
   a cam ring rotatably supported by said stationary cylinder;
   an adjusting ring provided on said stationary cylinder in such a manner that said adjusting ring is movable relative to said stationary cylinder and along the optical axis, said cam ring and said adjusting ring being successively positioned along the direction of the optical axis; and
   means for connecting said adjusting ring to said cam ring in such a manner that said adjusting ring and said cam ring can be rotated relative to each other and can be moved along the optical axis as a single body for a back focal distance adjustment of the zoom lens.

12. A zoom lens barrel according to claim 11, wherein said adjusting ring is incapable of overlapping said cam ring along the optical axis.

13. In a zoom barrel in which positions of all lens groups along the optical axis are determined in accordance with a position of a cam ring along the optical axis which is rotatably supported by a stationary cylinder, said zoom lens barrel comprising;
   said stationary cylinder is provided with an adjusting ring in such a manner that said adjusting ring is movable relative to said stationary cylinder and along the optical axis, said cam ring and said adjusting ring being successively positioned along the direction of the optical axis; and said adjusting ring and said cam ring are connected in such a manner that said adjusting ring and said cam ring can be rotated relative to each other and can be moved along the optical axis as a single body for a back focal distance adjustment of the zoom lens.

14. A zoom lens barrel according to claim 13, wherein said cam ring is provided with a gear ring, and said gear ring and said adjusting ring are connected in such a manner that said adjusting ring and said cam ring can be rotated relative to each other and can be moved along the optical axis as a single body.

15. A zoom lens barrel according to claim 14, wherein said adjusting ring is provided with projections at predetermined intervals along the circumference thereof, and said gear ring is provided with an annular groove with which said projections are engaged to be able to rotate in said annular groove, and notches through which said projections are inserted into said annular groove.

16. A zoom lens barrel according to claim 15, wherein said projections, said notches, and said annular groove are formed in such a manner that, in a range from the telephoto end to the wide-angle end, the positions of said projections and said notches do not coincide with each other.

17. A zoom lens barrel according to claim 14, wherein said gear ring is provided with a gear on an outer surface thereof, and a rotation of a motor for driving said lens groups is transmitted to said gear ring through said gear.

18. A zoom lens barrel according to claim 14, wherein said gear ring is provided with a gear on an inner surface thereof, and a rotation of a motor for driving said lens groups is transmitted to said gear ring through said gear.

19. A zoom lens barrel according to claim 13, wherein said adjusting ring is provided with a slot extending along the optical axis, and said stationary cylinder is provided with a guide screw which is engaged with said slot, whereby said adjusting ring is movable relative to said stationary cylinder along the optical axis and a rotation thereof relative to said stationary cylinder is restricted.

20. A zoom lens barrel according to claim 13, wherein said adjusting ring is provided with a large diameter hole and an elongated hole extending along the the circumference of said adjusting ring and connected to said large diameter hole, said stationary cylinder is provided with a support hole at the same optical axis position as that of said large diameter hole, and is provided with an adjusting disk in said support hole, said adjusting disk being provided with a rotation pin at a position offset from a center of said adjusting disk, and said rotation pin is engaged with said elongated hole.

21. A zoom lens barrel according to claim 13, wherein said adjusting ring is provided with a notch in which a motor for moving said cam ring to carry out a zooming operation is positioned.

22. A zoom lens barrel according to claim 13, wherein said adjusting ring is incapable of overlapping said cam ring along the optical axis.

* * * * *

UNITED STATES PATENT AND TRADEMARK OFFICE
CERTIFICATE OF CORRECTION

PATENT NO. : 5,144,494
DATED : September 1, 1992
INVENTOR(S) : Tetsuo SEKIGUCHI

It is certified that error appears in the above-indentified patent and that said Letters Patent is hereby corrected as shown below:

At column 8, line 17 (claim 20, line 3), change "the the" to ---the---.

Signed and Sealed this

Fifth Day of December, 1995

Attest:

BRUCE LEHMAN

Attesting Officer

Commissioner of Patents and Trademarks